US010546007B2

(12) United States Patent
Abou Mahmoud et al.

(10) Patent No.: US 10,546,007 B2
(45) Date of Patent: Jan. 28, 2020

(54) PRESENTATION OF SEARCH RESULTS DETAILS BASED ON HISTORY OF ELECTRONIC TEXTS RELATED TO USER

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 15/470,899

(22) Filed: Mar. 27, 2017

(65) Prior Publication Data

US 2018/0276295 A1    Sep. 27, 2018

(51) Int. Cl.
  *G06F 16/338* (2019.01)
  *G06F 16/33* (2019.01)
  *G06F 16/35* (2019.01)

(52) U.S. Cl.
  CPC ......... *G06F 16/338* (2019.01); *G06F 16/334* (2019.01); *G06F 16/353* (2019.01)

(58) Field of Classification Search
  CPC .... G06F 16/338; G06F 16/353; G06F 16/334; G06F 17/274; G06F 17/2785
  USPC ....................................... 707/727
  See application file for complete search history.

(56) References Cited

U.S. PATENT DOCUMENTS

| | | | |
|---|---|---|---|
| 7,860,871 B2* | 12/2010 | Ramer | G06Q 30/0241 707/751 |
| 8,620,915 B1 | 12/2013 | Brukman et al. | |
| 8,930,357 B2* | 1/2015 | White | G06F 16/24578 707/732 |
| 9,009,100 B2 | 4/2015 | Rechterman et al. | |
| 9,298,777 B2 | 3/2016 | Lawrence | |
| 9,594,850 B2* | 3/2017 | Donneau-Golencer | G06F 16/9032 |
| 2005/0221265 A1 | 10/2005 | Tashiro et al. | |
| 2008/0306935 A1* | 12/2008 | Richardson | G06F 16/9535 |
| 2009/0024385 A1 | 1/2009 | Hirsch | |
| 2011/0179116 A1* | 7/2011 | Solomon | G06Q 30/02 709/204 |
| 2014/0021198 A1 | 1/2014 | Persells | |
| 2014/0324902 A1* | 10/2014 | Morris | G06F 16/9535 707/766 |
| 2015/0169701 A1 | 6/2015 | Stekkelpak et al. | |

(Continued)

*Primary Examiner* — Robert W Beausoliel, Jr.
*Assistant Examiner* — Arthur Ganger
(74) *Attorney, Agent, or Firm* — North Shore Patents, P.C.; Joseph L. Acayan (57) ABSTRACT

In presenting search results, a server collects a history of electronic texts related to the user from electronic text sources and analyzes the electronic texts to determine a detail level score of the user. The detail level score indicates a preferred level of details in the communication style of a specific user. At some point, the server receives a notification of a search query input to a search system by a client device of the user. In response, the server intercepts the search results generated by the search system in response to the search query, retrieves the detail level score associated with the user, renders the search results with an amount of information corresponding to the detail level score. In this way, the search results may be displayed to the specific user in manner consistent with the user's preferred communication style.

18 Claims, 4 Drawing Sheets

(56) References Cited

U.S. PATENT DOCUMENTS

2016/0035237 A1  2/2016  Nealon et al.
2018/0211559 A1* 7/2018  Hamilton, II .......... G09B 19/04

* cited by examiner

Connect your printer to your network. The process for this varies from printer to printer. Most modern printers can connect to your network via Wi-Fi. Some printers may be ale to connect via an Ethernet cable, though this requires that they be close enough to the router for Ethernet to be viable.

Connect to the printer (Windows). Now that the printer is on the network, you can use the Windows "Add a Printer" wizard to automatically install the necessary software on your computer to use it. If you are using OS X, then skip down to the next step.

Connect to the printer (Mac OS X). Note that when attempting to connect to a network printer in OS X, it must support AirPrint or Bonjour. Check the documentation for your printer to ensure that it meets these specifications. If it doesn't, then you should still be able to connect via the IP address (See the Troubleshooting steps at the end fo this section).

Print to the network printer. Once you've added the printer to yoru operating system, you can print to it just as you would a printer connected directly to your computer. Simply select the printer from the "Print" window of any program.

FIG. 3A

Connect your printer to your network.

Connect to the printer (Windows).

Connect to the printer (Mac OS X).

Print to the network printer.

PRESENTATION OF SEARCH RESULTS DETAILS BASED ON HISTORY OF ELECTRONIC TEXTS RELATED TO USER

BACKGROUND

Different people have different communication styles. Some people prefer communicating with a high level of detail, while others prefer a low level of detail. For example, when giving written driving directions, some people provide detailed instructions, including cross-streets, landmarks, exit numbers, and turn-by-turn directions, while others provide basic instructions with only turn-by-turn directions. The manner in which people prefer to give information tend to be consistent with the manner in which they prefer to receive information.

Search systems in which users can input search queries are well known. In response to user input search queries, the search systems render search results. However, the level of detail in the rendered search results do not account for the manner in which a user prefers to receive information. The user may then experience frustration in either not receiving enough details or receiving too many details.

SUMMARY

Disclosed herein is a method for presenting search results based on history of electronic texts related to a user, and a computer program product and system as specified in the independent claims. Embodiments of the present invention are given in the dependent claims. Embodiments of the present invention can be freely combined with each other if they are not mutually exclusive.

According to an embodiment of the present invention, in presenting search results, a server collects a history of electronic texts related to the user from electronic text sources and analyzes the electronic texts to determine a detail level score of the user. The detail level score indicates a preferred level of details in the communication style of a specific user. At some point, the server receives a notification of a search query input to a search system by a client device of the user. In response, the server intercepts the search results generated by the search system in response to the search query, retrieves the detail level score associated with the user, renders the search results with an amount of information corresponding to the detail level score. In this manner, the research results may be displayed to the specific user in a more meaningful way. The rendered search results are sent to the client device to be displayed at the client device.

DETAILED DESCRIPTION

Embodiments of the present invention presents search results based on a history of electronic texts related to a user. The present invention determines a detail level score indicating a preferred level of details in the communication style of a specific user from the history electronic texts related to the user. When the present invention receives a notification of a search query input to a search system by the user, the present invention retrieves the detail level score associated with the user's identifier and renders the search results with an amount of information corresponding to the detail level score. In this way, the search results may be displayed to the specific user in a manner consistent with the user's preferred communication style.

Figure 1:
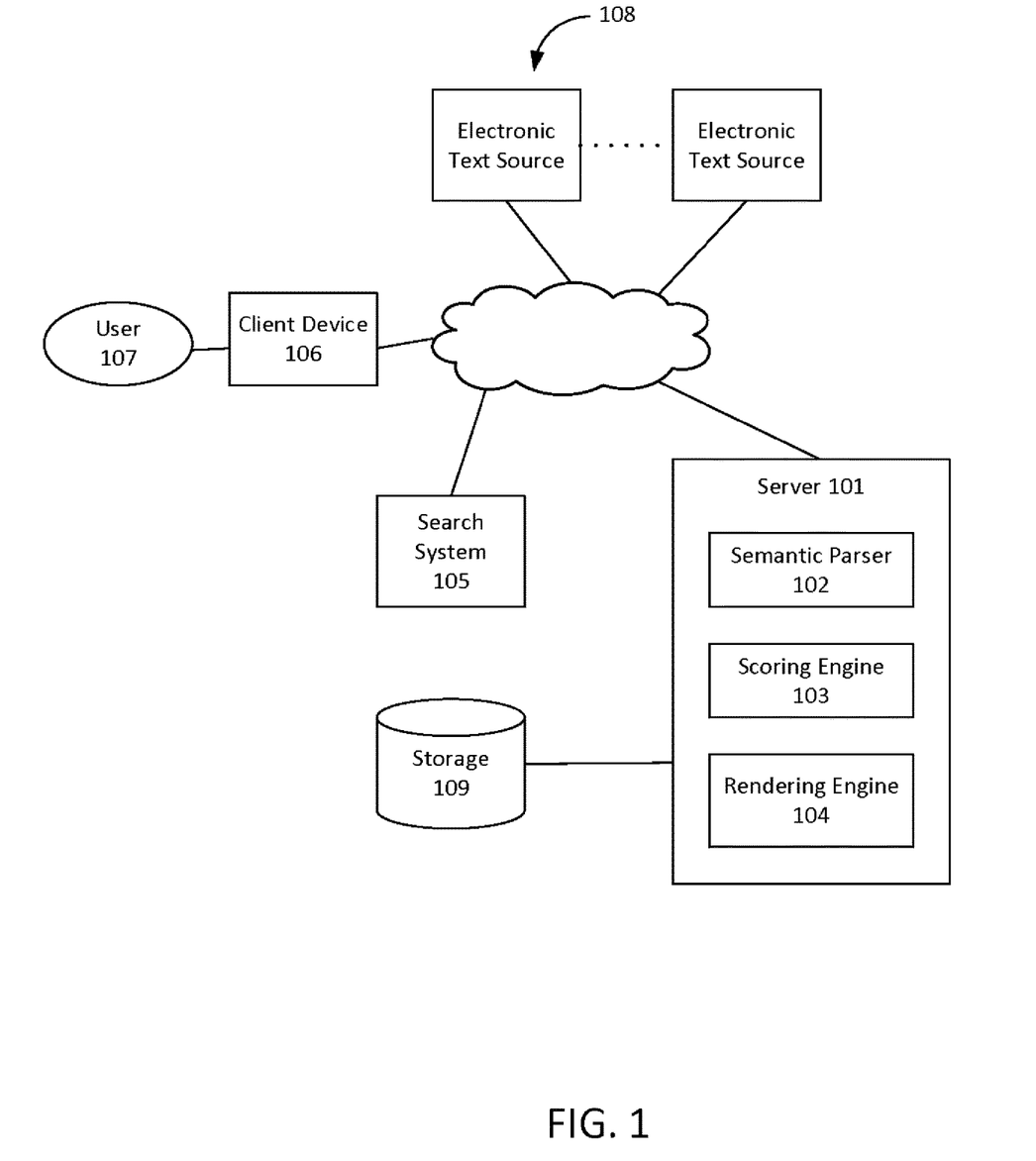
FIG. 1 illustrates an exemplary embodiment of a system for presenting search results based on a history of electronic texts related to a user, according to the present invention.
Figure 4:
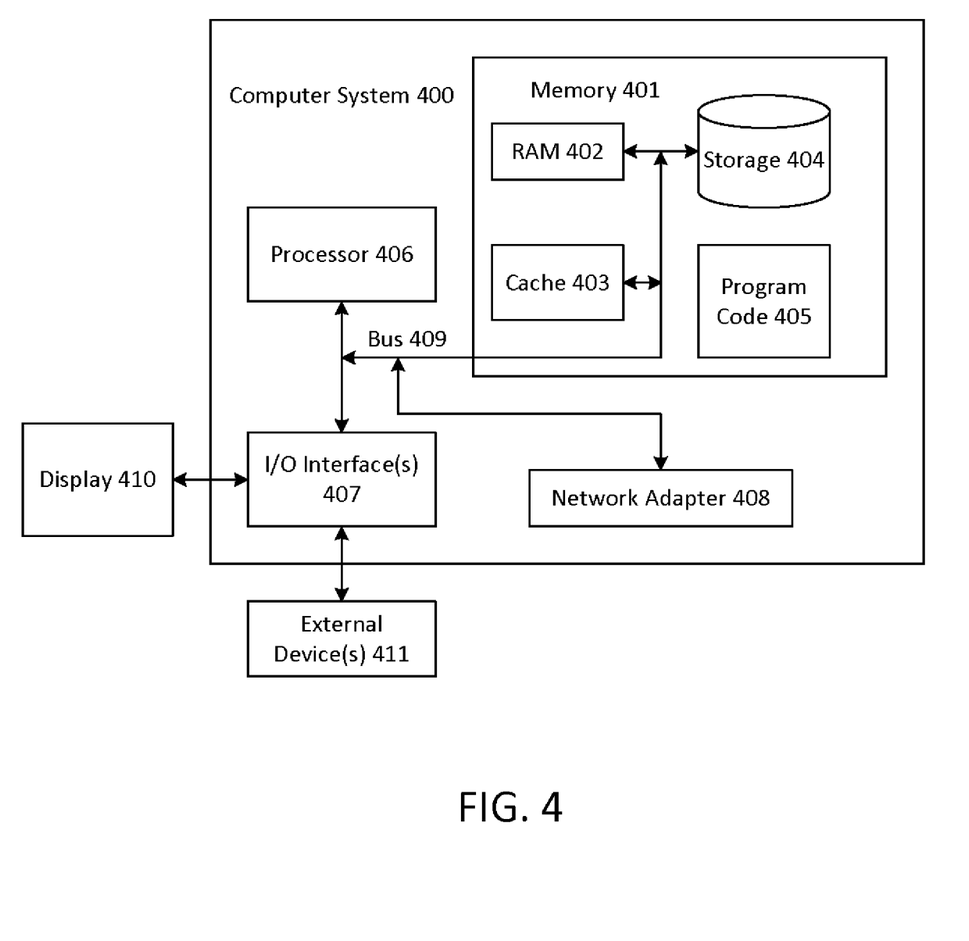
FIG. 4 illustrates a computer system for implementing the exemplary embodiments according to the present invention.

FIG. 1 illustrates an exemplary embodiment of a system for presenting search results based on a history of electronic texts related to a user, according to the present invention. The system includes a server 101 coupled over a network to one or more client devices 106 of users 107, a search system 105, and one or more electronic text sources 108. The server 101 includes a semantic parser 102, a scoring engine 103, and a rendering engine 104. The server 101 is further coupled to a storage 109. The server 101 is configured to obtain or receive a history of electronic texts related to a user 107 from the electronic text sources 108. The semantic parser 102 and scoring engine 103 of the server 101 are configured to analyze the history of electronic texts, to quantify the user's preferred level of detail when communicating, and to store the results in the storage 109. The client device 106 is configured to submit a search query from the user 107 to a search system 105, and the search system 105 is configured to create search results in response to the search query. The rendering engine 104 of server 101 is configured to intercept the search results and to map the results of analyses by the semantic parser 102 and scoring engine 103 to the search results. The components of the system, including the server 101, may be computer systems 400 as illustrated in FIG. 4 and described below. The semantic parser 102, scoring engine 103, and rendering engine 104 may be implemented by the program code 405 when executed by the processor 406 of the computer system 400. The functions of the semantic parser 102, scoring engine 103, and rendering engine 104 are described further below.

Figure 2:
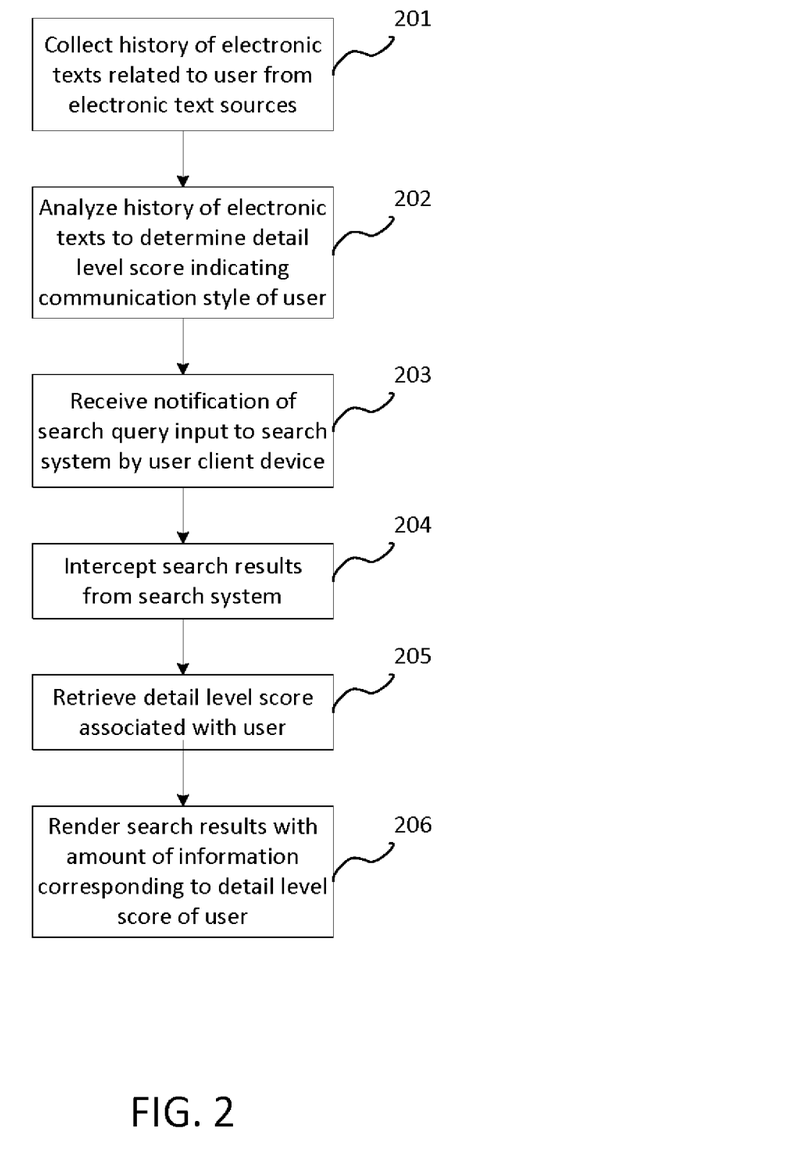
FIG. 2 illustrates an exemplary embodiment of a method for presenting search results based on a history of electronic texts related to a user, according to the present invention.

FIG. 2 illustrates an exemplary embodiment of a method for presenting search results based on a history of electronic texts related to a user, according to the present invention. Referring to both FIGS. 1 and 2, the server 101 collects a history of electronic texts related to a user 107 from one or more electronic text sources 108 (201). The electronic text sources 108 can include systems which provide access to social media posts, instant messages, e-mails, blogs, presentations, publications, etc. composed by the user 107. The server 101 analyzes the history of electronic texts to determine a detail level score indicating a communication style of the user 107 (202), described further below. At some point, the server 101 receives a notification of a search query input to the search system 105 by a user 107 via the user client device 106 (203). In one exemplary embodiment, the search query input is detected and the notification is generated by program code executed at the client device 106. In another exemplary embodiment, the search query input is detected and the notification is generated by program code embedded in a webpage and executed by a browser at the client device 106. Other mechanisms for detecting the search query input and for generating the notification can be used. In response to the search query input, the search system 105 generates search results to be displayed at the client device 106, and the rendering engine 104 of the server 101 intercepts the search results from the search system 105 (204). In response to the notification, the rendering engine 104 retrieves the detail level score associated with the user 107 (205) and renders the search results with an amount of information corresponding to the detail level score (206). The rendered search results can then be sent to and displayed by the client device 106.

In one exemplary embodiment, in analyzing the history of electronic texts, the semantic parser 102 parses the contents of the electronic texts using known parsing techniques, and the scoring engine 103 uses patterns identified in the parsed data to calculate a detail level score that represents the user's communication style in terms of the preferred level of details. The server 101 stores the detail level score in the storage 109 and associates the detail level score with a user identifier for the user 107. In response to the notification, the rendering engine 104 obtains the user identifier from the search query, a user login, or another known mechanism, retrieves the detail level score associated with the user identifier from the storage 109, and applies the detail level score to the search results from the search system 105 when rendering the search results. The search results with the amount of information corresponding to the detail level score is then sent to and displayed by the client device 106. The display of the search results can be through the browser at the client device 106.

In an exemplary embodiment, the detail level score is calculated according to a scale, where a high score indicates that the user prefers a high level of detail (larger amount of information) and a low score indicates that the user prefers a low level of detail (small amount of information). Thresholds can be used to quantify the detail level score. For example, different characteristics of the electronic text can be evaluated, such as the amount of text, an amount of description of a topic, the number photos or videos included in the text, and other types of characteristics. As the amounts or numbers reach certain thresholds, the detail level score can be raised. The characteristics evaluated and the thresholds can be implemented as configurable parameters.

Figure 3A:
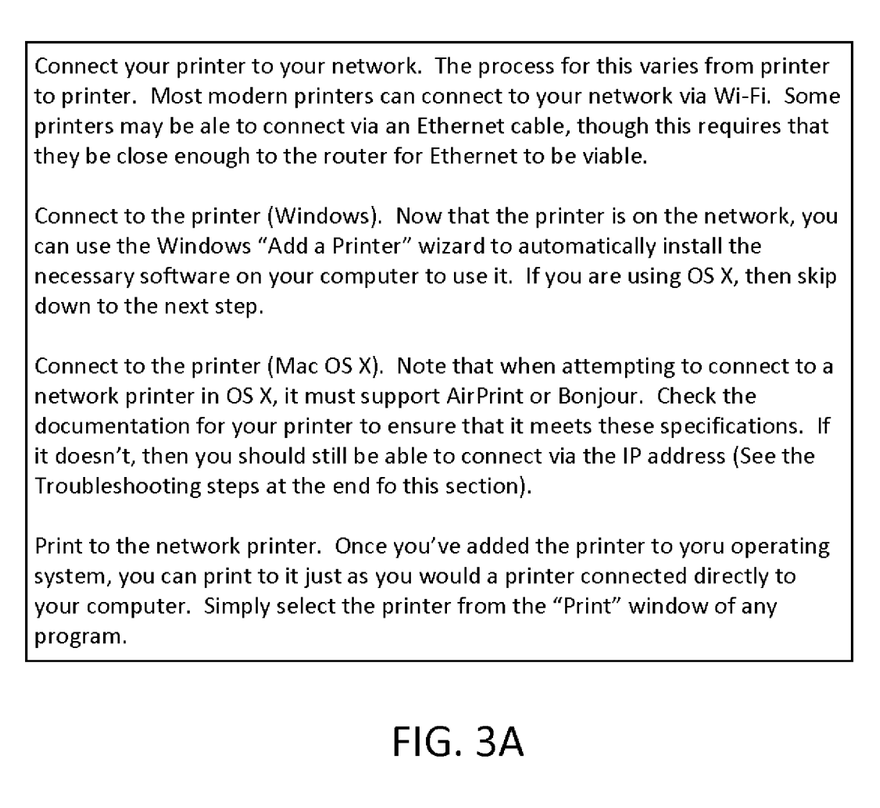
FIGS. 3A and 3B illustrate example rendered search results according to the present invention.
Figure 3B:
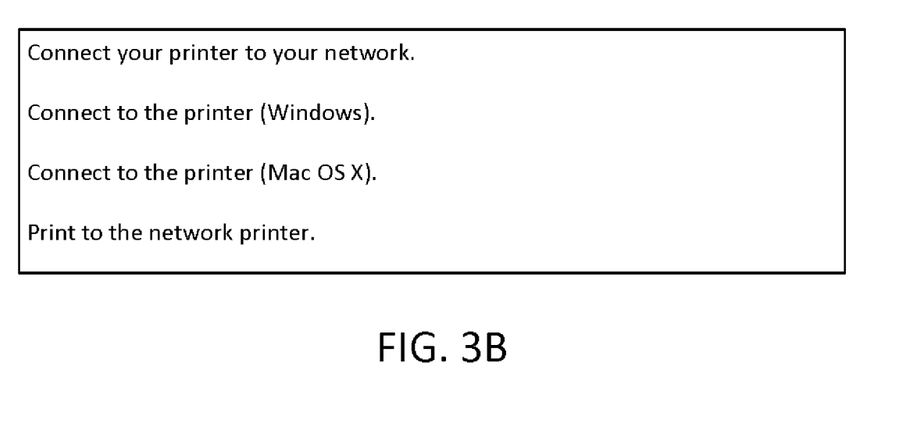

For example, assume that the user 107, using the client device 106, inputs a search query to the search system 105 for instructions to connect a network printer. The server 101 receives a notification of the search query input to the search system 105, and the rendering engine 104 retrieves the detail level score associated with the user's identifier from the storage 109. If the detail level score indicates a preference for a high level of detail, then the rendering engine 104 renders a large amount of information in the instructions to connect a network printer, for example as illustrated in FIG. 3A. Screen shots (not shown) may also be rendered as part of the search results. If the detail level score indicates a preference for a low level of detail, then the rendering engine 104 renders a small amount of information in the instructions, for example as illustrated in FIG. 3B. In this way, the instructions may be displayed at a client device in a manner consistent with the specific user's preferred communication style.

Optionally, in addition to evaluating the user's preference in the level of detail, the user's domain expertise and/or familiarity with a subject area may also be factors in the amount of detail to render in the search results. In an exemplary embodiment, the semantic parser 102 further categorizes the parsed text into groups based on topic or context, and the scoring engine 103 calculates a domain expertise score for the user in each category. Similarly, the scoring engine 103 can calculate a familiarity score for the user in each category. Data mined from the user's electronic texts, user profile data, as well as other data describing the user, can be used in calculating the domain expertise and familiarity scores using known techniques. The domain expertise and familiarity scores are then stored in the storage 109 and associated with the user identifier along with the detail level score. When the rendering engine 104 intercepts the search results, the semantic parser 102 would analyze the results to identify the corresponding category. The rendering engine 104 then retrieves the domain expertise score and/or the familiarity score associated with the user identifier for this category. For example, assume that in determining the amount of information to render, the rendering engine 104 retrieves a detail level score that indicates a high level of detail, however, the domain expertise score indicates that the user 107 is an expert in this category. The rendering engine 104 can be configured to render a lower level of detail than the detail level score indicates. For another example, assume that the detail level score indicates a low level of detail, however, the familiarity score indicates that the user 107 is not familiar with the subject matter in this category. The rendering engine 104 can be configured to render a higher level of detail than the detail level score indicates.

FIG. 4 illustrates a computer system for implementing the exemplary embodiments according to the present invention. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for presenting search results based on a history of electronic texts related to a user by a server, comprising:
   collecting, by the server, a history of electronic texts related to the user from one or more electronic text sources;
   analyzing, by the server, the history of the electronic texts to determine a detail level score indicating a communication style of the user;
   receiving, by the server, a notification of a search query input to a search system by a client device of the user;
   intercepting, by the server, search results generated by the search system in response to the search query;
   retrieving, by the server, the detail level score associated with the user;
   mapping, by the server, the search results to the detail level score;

determining, by the server, an amount of information from the search results to render based on the detail level score; and rendering, by the server, the search results with the amount of information corresponding to the detail level score.

2. The method of claim 1, wherein the analyzing of the history of the electronic texts comprises:
parsing the electronic texts;
calculating the detail level score using patterns identified in the parsed electronic texts; and
storing the detail level score in a storage associated with a user identifier for the user.

3. The method of claim 1, further comprising:
parsing the electronic texts;
categorizing the parsed electronic texts into one or more categories;
analyzing the parsed electronic texts and user profile data;
calculating a domain expertise score for the user and for each category of the one or more categories based on the analyzing of the parsed electronic texts and user profile data; and
determining the detail level score based at least in part on the domain expertise score.

4. The method of claim 1,
wherein the analyzing of the history of the electronic texts comprises:
parsing the electronic texts;
categorizing the parsed electronic texts based on topic or context;
calculating a domain expertise score for each category for the user; and
storing the domain expertise score for each category in a storage and associated with a user identifier for the user,
wherein the rendering of the search results with the amount of information corresponding to the detail level score further comprises:
analyzing the search query to identify a corresponding category;
retrieving the domain expert score associated with the user identifier for the corresponding category; and
applying the detail level score and the domain expert score in rendering the amount of information in the search results.

5. The method of claim 1,
wherein the analyzing of the history of the electronic texts comprises:
parsing the electronic texts;
categorizing the parsed electronic texts based on topic or context;
calculating a familiarity score for each category for the user; and
storing the familiarity score for each category in a storage and associated with a user identifier for the user,
wherein the rendering of the search results with the amount of information corresponding to the detail level score further comprises:
analyzing the search query to identify a corresponding category;
retrieving the familiarity score associated with the user identifier for the corresponding category; and
applying the detail level score and the familiarity score in rendering the amount of information in the search results.

6. The method of claim 1, further comprising:
sending the rendered search results to the client device to be displayed at the client device.

7. A computer program product for presenting search results based on a history of electronic texts related to a user, the computer program product comprising a computer readable storage medium having program instructions embodied therewith, the program instructions executable by a processor to cause the processor to:
collect a history of electronic texts related to a user from one or more electronic text sources;
analyze the history of the electronic texts to determine a detail level score indicating a communication style of the user;
receive a notification of a search query input to a search system by a client device of the user;
intercept search results generated by the search system in response to the search query;
retrieve the detail level score associated with the user;
map the search results to the detail level score;
determine an amount of information from the search results to render based on the detail level score; and
render the search results with the amount of information corresponding to the detail level score.

8. The computer program product of claim 7, wherein the analyzing of the history of the electronic texts comprises:
parse the electronic texts;
calculate the detail level score using patterns identified in the parsed electronic texts; and
store the detail level score in a storage associated with a user identifier for the user.

9. The computer program product of claim 7, wherein the retrieving of the detail level score associated with the user and the rendering of the search results with the amount of information corresponding to the detail level score comprise:
obtain a user identifier for the user associated with the search query;
retrieve the detail level score associated with the user identifier; and
apply the detail level score in rendering the amount of information in the search results.

10. The computer program product of claim 7,
wherein the analyzing of the history of the electronic texts comprises:
parse the electronic texts;
categorize the parsed electronic texts based on topic or context;
calculate a domain expertise score for each category for the user; and
store the domain expertise score for each category in a storage and associated with a user identifier for the user,
wherein the rendering of the search results with the amount of information corresponding to the detail level score further comprises:
analyze the search query to identify a corresponding category;
retrieve the domain expert score associated with the user identifier for the corresponding category; and
apply the detail level score and the domain expert score in rendering the amount of information in the search results.

11. The computer program product of claim 7,
wherein the analyzing of the history of the electronic texts comprises:

parse the electronic texts;
categorize the parsed electronic texts based on topic or context;
calculate a familiarity score for each category for the user; and
store the familiarity score for each category in a storage and associated with a user identifier for the user,
wherein the rendering of the search results with the amount of information corresponding to the detail level score further comprises:
analyze the search query to identify a corresponding category;
retrieve the familiarity score associated with the user identifier for the corresponding category; and
apply the detail level score and the familiarity score in rendering the amount of information in the search results.

12. The computer program product of claim 7, wherein the processor is further caused to:
send the rendered search results to the client device to be displayed at the client device.

13. A system comprising:
a processor; and
a computer readable storage medium having program instructions embodied therewith, the program instructions executable by a processor to cause the processor to:
collect a history of electronic texts related to a user from one or more electronic text sources;
analyze the history of the electronic texts to determine a detail level score indicating a communication style of the user;
receive a notification of a search query input to a search system by a client device of the user;
intercept search results generated by the search system in response to the search query;
retrieve the detail level score associated with the user;
map the search results to the detail level score;
determine an amount of information from the search results to render based on the detail level score; and
render the search results with the amount of information corresponding to the detail level score.

14. The system of claim 13, wherein the analyzing of the history of the electronic texts comprises:
parse the electronic texts;
calculate the detail level score using patterns identified in the parsed electronic texts; and
store the detail level score in a storage associated with a user identifier for the user.

15. The system of claim 13, wherein the retrieving of the detail level score associated with the user and the rendering of the search results with the amount of information corresponding to the detail level score comprise:

obtain a user identifier for the user associated with the search query;
retrieve the detail level score associated with the user identifier; and
apply the detail level score in rendering the amount of information in the search results.

16. The system of claim 13,
wherein the analyzing of the history of the electronic texts comprises:
parse the electronic texts;
categorize the parsed electronic texts based on topic or context;
calculate a domain expertise score for each category for the user; and
store the domain expertise score for each category in a storage and associated with a user identifier for the user,
wherein the rendering of the search results with the amount of information corresponding to the detail level score further comprises:
analyze the search query to identify a corresponding category;
retrieve the domain expert score associated with the user identifier for the corresponding category; and
apply the detail level score and the domain expert score in rendering the amount of information in the search results.

17. The system of claim 13,
wherein the analyzing of the history of the electronic texts comprises:
parse the electronic texts;
categorize the parsed electronic texts based on topic or context;
calculate a familiarity score for each category for the user; and
store the familiarity score for each category in a storage and associated with a user identifier for the user,
wherein the rendering of the search results with the amount of information corresponding to the detail level score further comprises:
analyze the search query to identify a corresponding category;
retrieve the familiarity score associated with the user identifier for the corresponding category; and
apply the detail level score and the familiarity score in rendering the amount of information in the search results.

18. The system of claim 13, wherein the processor is further caused to:
send the rendered search results to the client device to be displayed at the client device.

* * * * *